United States Patent
Sekiguchi et al.

(10) Patent No.: US 10,513,619 B2
(45) Date of Patent: Dec. 24, 2019

(54) INK, INK CONTAINER, INKJET RECORDING METHOD, INKJET RECORDING DEVICE, AND RECORDED MATTER

(71) Applicants: Satoyuki Sekiguchi, Kanagawa (JP); Daisuke Asahina, Shizuoka (JP); Yuusuke Fujita, Shizuoka (JP)

(72) Inventors: Satoyuki Sekiguchi, Kanagawa (JP); Daisuke Asahina, Shizuoka (JP); Yuusuke Fujita, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 408 days.

(21) Appl. No.: 15/297,646

(22) Filed: Oct. 19, 2016

(65) Prior Publication Data

US 2017/0130082 A1    May 11, 2017

(30) Foreign Application Priority Data

Nov. 11, 2015  (JP) .................. 2015-221574
Nov. 11, 2015  (JP) .................. 2015-221586
Jun. 28, 2016  (JP) .................. 2016-127955

(51) Int. Cl.
| | |
|---|---|
| *B41J 2/01* | (2006.01) |
| *C09D 11/107* | (2014.01) |
| *C09D 11/36* | (2014.01) |
| *C09D 125/14* | (2006.01) |
| *C09D 133/08* | (2006.01) |

(52) U.S. Cl.
CPC ............ *C09D 11/107* (2013.01); *C09D 11/36* (2013.01); *C09D 125/14* (2013.01); *C09D 133/08* (2013.01)

(58) Field of Classification Search
CPC .... C09D 11/107; C09D 11/36; C09D 125/14; C09D 133/08
See application file for complete search history.

(56) References Cited

U.S. PATENT DOCUMENTS

| | | |
|---|---|---|
| 2009/0286933 A1* | 11/2009 | Nagaishi .................. C09D 5/02 |
| | | 524/832 |
| 2011/0205288 A1 | 8/2011 | Matsuyama et al. |
| 2012/0188312 A1 | 7/2012 | Nakagawa |
| 2012/0308785 A1 | 12/2012 | Nakagawa |
| 2014/0267520 A1 | 9/2014 | Toda et al. |
| 2014/0377516 A1 | 12/2014 | Toda et al. |
| 2015/0077482 A1 | 3/2015 | Toda et al. |
| 2015/0259553 A1 | 9/2015 | Nakagawa et al. |

FOREIGN PATENT DOCUMENTS

| | | |
|---|---|---|
| JP | 2006-282986 | 10/2006 |
| JP | 2010-159355 | 7/2010 |

* cited by examiner

*Primary Examiner* — Irina S Zemel
*Assistant Examiner* — Jeffrey S Lenihan
(74) *Attorney, Agent, or Firm* — Oblon, McClelland, Maier & Neustadt, L.L.P.

(57) ABSTRACT

An ink includes a solvent and a resin, wherein the storage elastic modulus G1 of an ink film obtained by drying the ink is $2.0 \times 10^8$-$5.0 \times 10^8$ Pa at 20 degrees C. as measured by a dynamic viscoelasticity measuring method and the ratio (G2/G1) of the storage elastic modulus G1 to the storage elastic modulus G2 of the ink film measured at 80 degrees C. by the dynamic viscoelasticity measuring method is 0.30-0.85.

14 Claims, 1 Drawing Sheet

INK, INK CONTAINER, INKJET RECORDING METHOD, INKJET RECORDING DEVICE, AND RECORDED MATTER

CROSS-REFERENCE TO RELATED APPLICATIONS

This patent application is based on and claims priority pursuant to 35 U.S.C. § 119 to Japanese Patent Application Nos. 2015-221586, 2015-221574, and 2016-127955, filed on Nov. 11, 2015, Nov. 11, 2015, and Jun. 28, 2016, respectively, in the Japan Patent Office, the entire disclosure of which is hereby incorporated by reference herein.

BACKGROUND

Technical Field

The present invention relates to an ink, an ink container, an inkjet recording method, an inkjet recording device, and recorded matter.

Description of the Related Art

Image quality demanded for inkjet recording methods is on a par with the image quality of offset printing even when images are printed on coated paper, which is used in commercial printing and has poor ink absorbability. For example, ink including resin particles obtained by polymerizing a mixture including a monomer having an alkoxy silyl group is proposed.

SUMMARY

According to the present invention, provided is an improved ink which includes a solvent and a resin. The storage elastic modulus G1 of an ink film obtained by drying the ink is $2.0 \times 10^8$-$5.0 \times 10^8$ Pa at 20 degrees C. as measured by a dynamic viscoelasticity measuring method and the ratio (G2/G1) of the storage elastic modulus G1 to the storage elastic modulus G2 of the ink film measured at 80 degrees C. by the dynamic viscoelasticity measuring method is 0.30-0.85.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
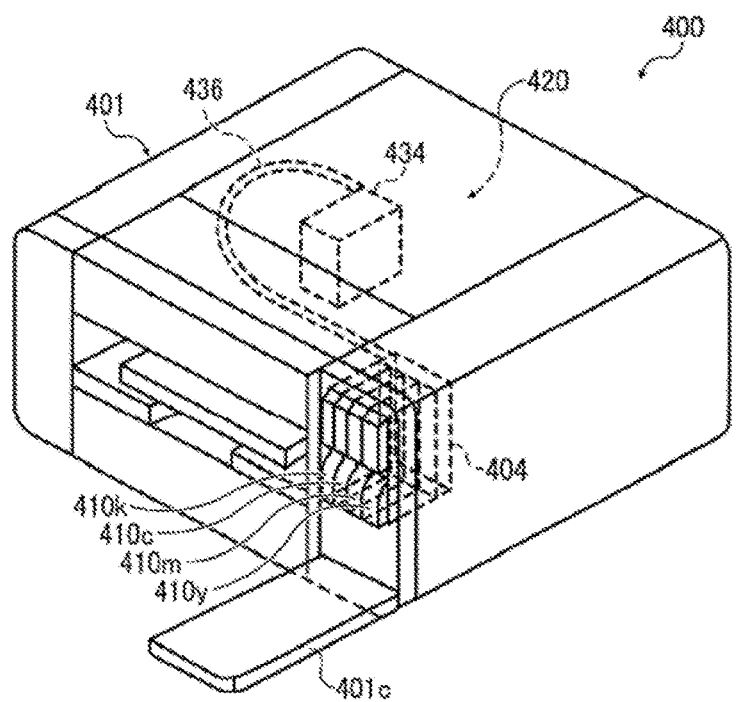
FIG. 1 is a perspective diagram illustrating an example of an inkjet recording device.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc. in the present disclosure represent the same meaning.

The ink of the present disclosure includes a solvent, a resin, and other optional components. The storage elastic modulus G1 of an ink film obtained by drying the ink is $2.0 \times 10^8$-$5.0 \times 10^8$ Pa at 20 degrees C. as measured by a dynamic viscoelasticity measuring method and the ratio (G2/G1) of the storage elastic modulus G1 to the storage elastic modulus G2 of the ink film measured at 80 degrees C. by the dynamic viscoelasticity measuring method is 0.30-0.85.

The storage elastic modulus G1 of the ink film at 20 degrees C. is $2.0 \times 10^8$-$5.0 \times 10^8$ Pa and preferably $2.5 \times 10^8$-$4.0 \times 10^8$ Pa. In addition, the ratio (G1/G2) is 0.30-0.85 and preferably 0.4-0.7.

When the storage elastic modulus G1 is $2.0 \times 10^8$ Pa or greater, the gloss level and blocking resistance of images are good. When the storage elastic modulus G1 is $5.0 \times 10^8$ Pa or less, abrasion resistance of images are improved. When the ratio (G1/G2) is 0.30 or greater, blocking resistance of images is good. When the ratio is 0.85 or less, the gloss level of images is improved.

The storage elastic modulus G3 of the ink film at −20 degrees C. as measured by the dynamic viscoelasticity measuring method is preferably $1.0 \times 10^9$ Pa or greater and more preferably $2.0 \times 10^9$ Pa. When the storage elastic modulus G3 is $1.0 \times 10^9$ Pa or greater, abrasion resistance of images is improved.

In addition, in terms of abrasion resistance of images, it is preferable that the storage elastic modulus G3 be $3.0 \times 10^8$ to less than $1.0 \times 10^9$ Pa and the storage elastic modulus G4 at −40 degrees C. be $1.0 \times 10^9$ Pa or greater. It is more preferable that the storage elastic modulus G3 be $4.0 \times 108$-$8.0 \times 10^8$ Pa and the storage elastic modulus G4 be $2.0 \times 10^9$ Pa or greater.

The storage elastic moduli G1, G2, G3, and G4 can be controlled by the mass average molecular mass, the average degree of polymerization, and the glass transition temperatures of the resin, and introduction of cross-linking structure to adjust those values within the ranges mentioned above.

The mass average molecular mass and the average degree of polymerization can be controlled by an initiator or a chain transfer agent in the case of a chain polymerization resin and, the ratio of functional groups, in the case of resins obtained by polycondensation or polyaddition.

The glass transition temperature can be mainly controlled by the monomer composition. However, if the glass transition temperature is outside the range specified later, it may be difficult to set the storage elastic modulus G1 and G2/G1 within the ranges mentioned above.

To set the storage elastic modulus G1 and the ratio (G1/G2) within the ranges, it is preferable for the resin to have a cross-linking structure by a cross-linking agent such as a polyfunctional monomers. However, if the condensation of the cross-linking agent is too high, the storage elastic moduli G1 and G2 increase, which makes it difficult to satisfy the value ranges mentioned above. In addition to the concentration of the cross-linking agent, if there is a factor having an impact on the speed of cross-linking reaction, the factor is required to be adjusted. For example, as described in Examples described later, it is not possible to satisfy the value ranges specified above by an alkoxysilane-based compound because cross-linking reaction proceeds excessively if pH during polymerization is too low.

The storage elastic moduli G1, G2, G3, and G4 can be measured under the following conditions.

First, the ink is dried for 48 hours at 100 degrees C. in a constant temperature tank employing heated wind circulation system to obtain an ink film having a thickness of about 0.3 mm, which is cut to a size of a length of about 30 mm and a width of about 10 mm. Thereafter, the ink film is measured by using ARES-G2 (manufactured by TA Instruments) with a freezer. After the sample of the ink film is set in a device at 20 degrees C. using a torsion solid clamp as a jig for fixing a sample, the sample is cooled down to −60 degrees C. under an auto tension of 2 g. 10 minutes after the temperature reaches −60 degrees, the sample is measured under the following conditions. Based on the obtained measuring data, the storage elastic modulus at 20 degrees C. is defined as G1, the storage elastic modulus at 80 degrees C. is defined as G2, the storage elastic modulus at −20 degrees C. is defined as G3, and the storage elastic modulus at −40 degrees C. is defined as G4.

Measuring Conditions
Measuring mode: temperature sweep
Measuring range of temperature: −60-100 degrees C.
Temperature rising speed: Heating speed: 5 degrees C./min
Frequency: 1 Hz
Initial distortion: 0.1 percent
Auto tension: 2 g The content of the tetrahydrofuran (THF) soluble portion of the rein in the ink film is 20-50 percent by mass and preferably from 25 to 40 percent by mass.

When the content of the THF soluble portion is 20 percent by mass or greater, smear fixability is improved. When the content of the THF soluble portion is 50 percent by mass or less, gloss level is improved and image density becomes good.

The content of the THF soluble portion of the rein in the ink film can be measured in the following manner.

First, ink is dried for 1 day at 100 degrees C. in a constant temperature tank employing heated wind circulation system to obtain an ink film having a thickness of about 0.3 mm, which is cut to a size of a length of about 50 mm and a width of about 10 mm.

The ink film cut to the size is dipped in 50 g of deionized water and maintained at 50 degrees C. for one day. Thereafter, the ink film is taken out from the deionized water and dried at 50 degrees C. for one day.

Next, about 30 mg of the ink film subjected to dipping treatment with deionized water is placed in an aluminum sample container, which is set in a thermogravimetric analyzer (SHIMADZU DTG-60, manufactured by Shimadzu Corporation), and measured in a nitrogen atmosphere in the following conditions.

Measuring Conditions
Temperature is raised from 40 to 100 degrees C. as a temperature rising speed of 10 degrees/minute.
Maintained at 100 degrees C. for 10 minutes
Temperature is raised from 100 to 500 degrees C. as a temperature rising speed of 10 degrees/minute.
Maintained at 500 degrees C. for 10 minutes Thereafter, based on the obtained measuring results, the content R (percent by mass) of the resin in the ink film can be calculated from the mass M1 (mg) obtained after 10 minutes at 100 degrees C. and the mass M2 (mg) obtained after 10 minutes at 500 degrees C.

$$R=(M1-M2)/M1\times100$$

1 g of the dried film obtained after dipping treatment with deionized water is dipped in 10 g of THF and maintained at room temperature for one day.

The supernatant of the dip coated liquid is dried at 150 degrees C. for 3 hours in a drier and the THF soluble portion (percent) of the resin in the dried film is calculated assigning the masses before and after drying into the following relation.

In the following relation, M3 (g) is the mass of the dried film dipped in THS, M4 (g) is the mass of THF for use in dipping the dried film, M5 (g) is the mass of the supernatant of the dried dipping liquid, and M6 (g) is the mass after drying.

$$T=(M4\times M6)/(M3\times M5)\times100$$

Based on the content R of the resin in the ink film and the THF soluble portion T (percent) of the resin in the dried film, the THF soluble portion of the resin contained in the dried film obtained by drying the ink of the present disclosure is calculated according to the following relation.

THF soluble portion of the resin contained in the dried film obtained by drying the ink of the present disclosure=$T/R\times100$ The glass transition temperature of the THF soluble portion is −20 to 20 degrees C. and more preferably −10 to 10 degrees C. as measured by DSC.

When the glass transition temperature is outside the range of from −20 to 20 degrees C., blocking resistance may deteriorate.

The glass transition temperature can be measured by DSC SYSTEM Q-2000 (manufactured by TA INSTRUMENTS. JAPAN).

Specifically, about 5.0 mg of the resin placed in an aluminum sample container is set in an instrument to conduct measuring in nitrogen atmosphere under the following conditions.

A DSC curve at the second temperature rising is selected and the glass transition temperature is obtained by the midpoint method.

Hold 5 minutes after cooled down to −70 degrees C.
Raise the temperature to 120 degrees C. at a temperature raising speed of 10 degrees C./min.
Hold 5 minutes after cooled down to −70 degrees C.
Raise the temperature to 120 degrees C. at a temperature raising speed of 10 degrees C./min.

The mass average molecular mass obtained by gel permeation chromatography (GPC) of the THF soluble portion is preferably 200,000-900,000 and more preferably 300,000-700,000 to improve smear fixability and gloss level.

When the mass average molecular mass is 200,000-900,000, blocking resistance is good and smear fixability and gloss level are improved.

The mass average molecular mass can be measured by using a gel permeation chromatography (GPC) measuring device (for example, HLC-8220 GPC, manufactured by TOSOH CORPORATION).

The column used is TSKgel Super HZM-M 15 cm triplet (manufactured by TOSOH CORPORATION).

The resin to be measured is dissolved in THF to obtain a 0.15 percent by mass THF solution (including a stabilizer, manufactured by WAKO PURE CHEMICAL INDUSTRIES, LTD.) followed by filtration using a filter having an opening of 0.2 μm. The resultant filtrate is used as a sample.

100 μl of the THF sample solution is injected into the measuring instrument and the measuring is conducted under the condition that the temperature is 40 degrees C. and the flow speed is 0.35 mL/min.

The mass average molecular weight is calculated by using a standard curve created by a mono-dispersed polystyrene standard sample.

As the mono-dispersed polystyrene standard sample, Showdex STANDARD SERIES (manufactured by SHOWA DENKO K.K.) and toluene are used.

THF solutions of the following three kinds of mono-dispersed polystyrene standard samples are prepared and the measuring is conducted under the conditions specified above to create a standard curve by defining the maintaining time of the peak top as the light scattering molecular mass of the mono-dispersed polystyrene standard samples.

Solution A: S-7450 2.5 mg, S-678 2.5 mg, S-46.5 2.5 mg, S-2.90 2.5 mg, and THF 50 mL Solution B: S-3730 2.5 mg, S-257 2.5 mg, S-19.8 2.5 mg, S-0.580 2.5 mg, and THF 50 mL Solution C: S-1470 2.5 mg, S-112 2.5 mg, S-6.93 2.5 mg, S-2.90 2.5 mg, and THF 50 mL A refractive index (RI) detector is used as the detector.

THF insoluble portion of the resin contained in the ink film is preferably cross-linked by a polyfunctional monomer, etc. in terms of blocking resistance.

Ink

The ink includes a solvent and a resin and preferably a coloring material and other optional components.

The solvent preferably includes water and an organic solvent.

Organic solvents, water, coloring materials, resins, and additives for use in the ink are described next.

Organic Solvent

There is no specific limitation on the type of the organic solvent used in the present disclosure. For example, water-soluble organic solvents are suitable. Examples are polyols, ethers such as polyol alkylethers and polyol arylethers, nitrogen-containing heterocyclic compounds, amides, amines, and sulfur-containing compounds.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrolidone, N-methyl-2-pyrolidone, N-hydroxyethyl-2-pyrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propioneamide, and 3-buthoxy-N,N-dimethyl propioneamide; amines such as monoethanolamine, diethanolamine, and triethylamine; sulfur-containing compounds such as dimethyl sulfoxide, sulfolane, and thiodiethanol; propylene carbonate, and ethylene carbonate.

Since the water-soluble organic solvent serves as a humectant and also imparts a good drying property, it is preferable to use an organic solvent having a boiling point of 250 degrees C. or lower.

Polyol compounds having eight or more carbon atoms and glycol ether compounds are also suitable. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyol alkylethers such as ethyleneglycol monoethylether, ethyleneglycol monobutylether, diethylene glycol monomethylether, diethyleneglycol monoethylether, diethyleneglycol monobutylether, tetraethyleneglycol monomethylether, propyleneglycol monoethylether; and polyol arylethers such as ethyleneglycol monophenylether and ethyleneglycol monobenzylether.

The polyol compounds having eight or more carbon atoms and glycolether compounds enhance permeability of ink when paper is used as a print medium.

The proportion of the organic solvent in ink has no particular limit and can be suitably selected to suit a particular application.

In terms of the drying property and discharging reliability of the ink, the proportion is preferably 10-60 percent by mass and more preferably 20-60 percent by mass.

Water

The proportion of water in the ink has no particular limit and can be suitably selected to suit to a particular application. In terms of the drying property and discharging reliability of the ink, the proportion is preferably 10-90 percent by mass and more preferably 20-60 percent by mass.

Coloring Material

The coloring material has no particular limit. For example, pigments and dyes are usable.

The pigment includes inorganic pigments and organic pigments. These can be used alone or in combination. In addition, it is possible to use a mixed crystal.

As the pigments, for example, black pigments, yellow pigments, magenta pigments, cyan pigments, white pigments, green pigments, orange pigments, gloss pigments of gold, silver, etc., and metallic pigments can be used.

As the inorganic pigments, in addition to titanium oxide, iron oxide, calcium oxide, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black can be used. Of these pigments, pigments having good affinity with solvents are preferable. Also, hollow resin particles and hollow inorganic particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rohdamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63; C.I. Pigment Green 1, 4, 7, 8, 10, 17, 18, and 36.

The type of dye is not particularly limited and includes, for example, acidic dyes, direct dyes, reactive dyes, basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the coloring material in ink is preferably 0.1-15 percent by mass and more preferably 1-10 percent by mass in terms of enhancement of image density, fixability, and discharging stability.

To disperse a pigment in ink, for example, a hydrophilic functional group is introduced into the pigment to prepare a self-dispersible pigment, the surface of the pigment is coated with a resin, or a dispersant is used to disperse the pigment.

As a method of introducing a hydrophilic functional group into a pigment to prepare a self-dispersible pigment, it is possible to use, for example, a self-dispersion pigment, etc. in which a functional group such as a sulfone group and a carboxyl group is added to a pigment (e.g., carbon) to make it dispersible in water.

To coat the surface of the pigment with a resin, the pigment is encapsulated by microcapsules to make the pigment dispersible in water. This can be referred to as a resin-coated pigment. In this case, all the pigments to be added to ink are not necessarily coated with a resin. Pigments partially or wholly uncovered with a resin may be dispersed in the ink unless the pigments have an adverse impact.

In a method of using a dispersant to disperse a pigment, for example, a known dispersant of a small molecular weight or a large molecular weight, which is represented by a surfactant, is used to disperse the pigment in ink.

As the dispersant, it is possible to select, for example, an anionic surfactant, a cationic surfactant, a nonionic surfactant, an amphoteric surfactant, etc. depending on a pigment.

Also, a nonionic surfactant (RT-100, manufactured by TAKEMOTO OIL & FAT CO., LTD.) and a formalin condensate of naphthalene sodium sulfonate are suitable as the dispersant.

Those can be used alone or in combination.

Pigment Dispersion

A coloring material may be mixed with materials such as water and an organic solvent to obtain ink. It is also possible to mix a pigment with water, a dispersant, etc., first to prepare a pigment dispersion and thereafter mix the pigment dispersion with materials such as water and organic solvent to manufacture ink.

The pigment dispersion can be obtained by dispersing water, a pigment, a pigment dispersant, and other optional components and adjusting the particle size. It is good to use a dispersing device for dispersion.

The particle diameter of the pigment in the pigment dispersion has no particular limit. For example, the maximum frequency in the maximum number conversion is preferably 20-500 nm and more preferably 20-150 nm to improve dispersion stability of the pigment and ameliorate discharging stability and image quality such as image density. The particle diameter of the pigment can be measured using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and image density, the proportion is preferably 0.1-50 percent by mass and more preferably 0.1-30 percent by mass.

It is preferable that the pigment dispersion be filtered with a filter, a centrifuge, etc. to remove coarse particles and thereafter degassed.

Resin

The type of the resin contained in ink has no particular limit and can be suitably selected to suit to a particular application. Specific examples thereof include, but are not limited to, urethane resins, polyester resins, acrylic resins, vinyl acetate-based resins, styrene-based resins, butadiene-based resins, styrene-butadiene-based resins, vinyl chloride-based resins, acrylic styrene resins, and acrylic silicone-based resins.

Resin particles formed of such resins may be also used. It is possible to mix a resin emulsion in which the resin particles are dispersed in water serving as a dispersion medium with materials such as a coloring material and an organic solvent to obtain ink. The resin particle can be synthesized or is available on the market. These can be used alone or in combination of the resin particles.

The resin preferably includes resin particles formed of an acrylic resin or an acrylic styrene resin in terms of abrasion resistance of images and storage stability for an extended period of time of ink.

The resin is preferably cross-linked by a polyfunctional monomer, etc. If a non-cross-linked resin particle is used, gloss level and blocking resistance may deteriorate.

Specific examples of the polyfunctional monomers include, but are not limited to, divinyl monomers such as divinyl benzene and ethylene glycol dimethactylate in the case of resins prepared by radical polymerizable monomers, monomers having reactive functional groups such as glycidylmethacrylate and vinyltrimethoxy silane, and monomers such as trimethylol propane in the case of polyesters and polyurethanes.

The resin preferably includes a structure derived from a reactive emulsifier. Usage of such a reactive emulsifier enhances storage stability of ink.

There is no specific limitation to the reactive emulsifier and it can be suitably selected to suit to a particular application. For example, emulsifiers having radical polymerizable double bonds are particularly preferable. The reactive emulsifiers are available on the market.

Specific examples of the products available on the market include, LATEMUL S-180 (manufactured by Kao Corporation), ELEMINOL JS-2 (manufactured by Sanyo Chemical Industries, Ltd.), and AQUALON RN-20 (manufactured by DKS Co. Ltd.).

The mass average molecular mass when the resin is non-cross-linked is preferably 200,000-900,000 and more preferably 300,000-700,000. When the mass average molecular mass is 200,000-900,000, blocking resistance is good and smear fixability and gloss level are improved.

The mass average molecular mass of the resin can be measured by using a gel permeation chromatography (GPC) measuring device (for example, HLC-8220 GPC, manufactured by TOSOH CORPORATION).

The column used is TSKgel Super HZM-M 15 cm triplet (manufactured by TOSOH CORPORATION). The resin to be measured is dissolved to obtain a 0.15 percent by mass solution of tetrahydrofuran (THF) (containing a stabilizer, manufactured by WAKO PURE CHEMICAL INDUSTRIES, LTD.) followed by filtration using a filter having an opening of 0.2 μm. The resultant filtrate is used as a sample. 100 μl of the THF sample solution is injected into the measuring instrument under the condition that the temperature is 40 degrees C. and the flow speed is 0.35 mL/min.

The molecular mass is calculated by using a standard curve created by a mono-dispersed polystyrene standard sample. As the mono-dispersed polystyrene standard sample, Showdex STANDARD SERIES (manufactured by SHOWA DENKO K.K.) and toluene are used. THF solutions of the following three kinds of mono-dispersed polystyrene standard samples are prepared and measuring is conducted under the conditions specified above to create a standard curve by defining the maintaining time of the peak top as the light scattering molecular mass of the mono-dispersed polystyrene standard samples.

Solution A: S-7450 2.5 mg, S-678 2.5 mg, S-46.5 2.5 mg, S-2.90 2.5 mg, and THF 50 mL Solution B: S-3730 2.5 mg, S-257 2.5 mg, S-19.8 2.5 mg, S-0.580 2.5 mg, and THF 50 mL Solution C: S-1470 2.5 mg, S-112 2.5 mg, S-6.93 2.5 mg, S-2.90 2.5 mg, and THF 50 mL A refractive index (RI) detector is used as the detector.

The glass transition temperature of the resin is preferably −50-20 degrees C. and more preferably −35-5 degrees C. When the glass transition temperature is −50-20 degrees C., blocking resistance is good and smear fixability and gloss level are improved.

The glass transition temperature is measurable by DSC SYSTEM Q-2000 (manufactured by TA INSTRUMENTS. JAPAN). Specifically, about 5.0 mg of a resin placed in an aluminum sample container is set in an instrument to conduct measuring in nitrogen atmosphere under the following conditions. A DSC curve at the second temperature rising is selected and the glass transition temperature is obtained by the midpoint method.

Measuring Conditions

Hold 5 minutes after cooled down to −70 degrees C.

Raise the temperature to 120 degrees C. at a temperature raising speed of 10 degrees C./min.

Hold 5 minutes after cooled down to −70 degrees C.

Raise the temperature to 120 degrees C. at a temperature raising speed of 10 degrees C./min.

The volume average particle diameter of the resin particle is not particularly limited and can be suitably selected to suit to a particular application. The volume average particle diameter is preferably 10-1,000 nm, more preferably 10-200 nm, and particularly preferably 10-100 nm to obtain good fixability and image hardness.

The volume average particle diameter can be measured by using, for example, a particle size analyzer (Nanotrac Wave-UT151, manufactured by MicrotracBEL Corp.).

The proportion of the resin is not particularly limited and can be suitably selected to suit to a particular application. In terms of fixability and storage stability of ink, it is preferably 1-30 percent by mass and more preferably 5-20 percent by mass to the total content of the ink.

The particle diameter of the solid portion in ink is not particularly limited and can be suitably selected to suit to a particular application. For example, the maximum frequency in the maximum number conversion is preferably 20-1,000 nm and more preferably 20 to 150 nm to ameliorate the discharging stability and image quality such as image density. The solid portion includes resin particles, particles of pigments, etc. The particle diameter can be measured by using a particle size analyzer (Nanotrac Wave-UT151, manufactured by MicrotracBEL Corp).

Additive Agent

Ink may further optionally include a surfactant, a defoaming agent, a preservative and fungicide, a corrosion inhibitor, a pH regulator, etc.

Surfactant

Examples of the surfactant are silicone-based surfactants, fluoro-surfactants, amphoteric surfactants, nonionic surfactants, anionic surfactants, etc.

The silicone-based surfactant has no specific limit and can be suitably selected to suit to a particular application.

Of these, preferred are silicone-based surfactants which are not decomposed even in a high pH environment.

Specific examples thereof include, but are not limited to, side-chain-modified polydimethylsiloxane, both-distal end-modified polydimethylsiloxane, one-distal-end-modified polydimethylsiloxane, and side-chain-both-distal-end-modified polydimethylsiloxane. A silicone-based surfactant having a polyoxyethylene group or a polyoxyethylene polyoxypropylene group is particularly preferable because such an agent demonstrates good characteristics as an aqueous surfactant. It is possible to use a polyether-modified silicone-based surfactant as the silicone-based surfactant. A specific example thereof is a compound in which a polyalkylene oxide structure is introduced into the side chain of the Si site of dimethyl silooxane.

Specific examples of the fluoro-surfactants include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because they do not produce foams easily.

Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carboxylic acid compounds include, but are not limited to, perfluoroalkyl carboxylic acid and salts of perfluoroalkyl carboxylic acid. Specific examples of the polyoxyalkylene ether polymer compounds having a perfluoroalkyl ether group in its side chain include, but are not limited to, salts of sulfuric acid ester of polyoxyalkylene ether polymer having a perfluoroalkyl ether group in its side chain and salts of polyoxyalkylene ether polymers having a perfluoroalkyl ether group in its side chain. Counter ions of salts in these fluoro-surfactants are, for example, Li, Ha, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactants has no particular limit and can be suitably selected to suit to a particular application.

Specific examples thereof include, but are not limited to, side-chain-modified polydimethyl siloxane, both distal-end-modified polydimethylsiloxane, one-distal-end-modified polydimethylsiloxane, and side-chain-both-distal-end-modified polydimethylsiloxane. In particular, a polyether-modified silicone-based surfactant having a polyoxyethylene group or a polyoxyethylene polyoxypropylene group is particularly preferable because such a surfactant demonstrates good characteristics as an aqueous surfactant.

Any suitably synthesized surfactant and any product thereof available on the market is suitable. Products available on the market can be obtained from Byc Chemie Japan Co., Ltd., Shin-Etsu Silicone Co., Ltd., Dow Corning Toray Co., Ltd., etc., NIHON EMULSION Co., Ltd., Kyoeisha Chemical Co., Ltd., etc.

The polyether-modified silicon-containing surfactant has no particular limit and can be suitably selected to suit to a particular application. For example, a compound is usable in which the polyalkylene oxide structure represented by the following Chemical structure S-1 is introduced into the side chain of the Si site of dimethyl polysiloxane.

Chemical formula S-1

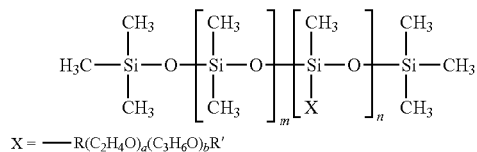

$X = ——R(C_2H_4O)_a(C_3H_6O)_bR'$

In the Chemical formula S-1 illustrated above, m, n, a, and b independently represent integers. In addition, R and R' independently represent alkyl groups and alkylene groups.

Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Japan KK.), and TSF4440, TSF4452, and TSF4453 (all manufactured by Momentive Performance Materials Inc.).

A fluoro-surfactant in which the number of carbon atoms replaced with fluorine atoms is 2-16 is preferable and, 4 to 16, more preferable.

Specific examples of the fluorosurfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain.

Of these, polyoxyalkylene ether polymer compounds having a perfluoroalkyl ether group in its side chain are preferable because they do not produce foams easily and the fluoro-surfactants represented by the following Chemical formula F-1 or Chemical formula F-2 are more preferable.

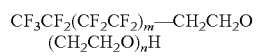

Chemical formula F-1

As to the compounds represented by Chemical formula F-1, "m" is preferably 0 or an integer of from 1 to 10 and "n" is preferably 0 or an integer of from 1 to 40.

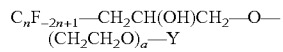

Chemical formula F-2

In the compound represented by the chemical formula F-2, Y represents H or $C_nF_{2n+1}$, where n represents an integer of 1-6, or $CH_2CH(OH)CH_2$—$CnF_{2n+}1$, where n represents an integer of 4-6, or $CpH_{2p+1}$, where p is an integer of 1-19, "a" represents an integer of from 4 to 14.

As the fluoro-surfactant, products available on the market may be used.

Specific examples of the products available from the market include, but are not limited to, SURFLON S-111, SURFLON S-112, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, FS-300 UR (all manufactured by E. I. du Pont de Nemours and Company); FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.); and UNIDYNE™ DSN-403N (manufactured by DAIKIN INDUSTRIES, Ltd.). Among these, in terms of improvement on print quality, in particular coloring property and permeability, wettability, and uniform dying property on paper, FS-300 of E. I. du Pont de Nemours and Company, FT-110, FT-250, FT-251, FT-400S, FT-150, and FT-400SW of NEOS COMPANY LIMITED, POLYFOX PF-151N of OMNOVA SOLUTIONS INC., and UNIDYNE™ DSN-403N (manufactured by DAIKIN INDUSTRIES, Ltd.) are particularly preferable.

The proportion of the surfactant in ink is not particularly limited and can be suitably selected to suit to a particular application. It is preferably 0.001-5 percent by mass and more preferably 0.05-5 percent by mass in terms of excellent wettability and discharging stability and improvement on image quality.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable to easily break foams.

Preservatives and Fungicides

The preservatives and fungicides are not particularly limited. A specific example is 1,2-benzisothiazoline-3-on.

Corrosion Inhibitor

The corrosion inhibitor has not particular limitation. Examples thereof are acid sulfite and sodium thiosulfate.

pH Regulator

The pH regulator has no particular limit. It is preferable to adjust the pH to 7 or higher. Specific examples thereof include, but are not limited to, amines such as diethanol amine and triethanol amine.

The property of the ink is not particularly limited and can be suitably selected to suit to a particular application. For example, viscosity, surface tension, pH, etc, are preferable in the following ranges.

Viscosity of ink at 25 degrees C. is preferably 5-30 mPa·s and more preferably 5-25 mPa·s to improve print density and text quality and obtain good dischargeability.

Viscosity can be measured by, for example, a rotatory viscometer (RE-80L, manufactured by TOKI SANGYO CO., LTD.). The measuring conditions are as follows:

Standard cone rotor (1° 34'×R24)
Sample liquid amount: 1.2 mL
Number of rotations: 50 rotations per minute (rpm)
25 degrees C.
Measuring time: three minutes The surface tension of the ink is preferably 35 mN/m or less and more preferably 32 mN/m or less at 25 degrees C. in terms that the ink is suitably levelized on a recording medium and the drying time of the ink is shortened.

The pH of the ink is preferably from 7 to 12 and more preferably from 8 to 11 in terms of prevention of corrosion of metal materials contacting the ink.

Recording Medium

The recording medium for use in recording is not particularly limited. Specific examples thereof include, but are not limited to, plain paper, gloss paper, special paper, cloth, film, transparent sheets, printing paper for general purpose.

Recorded Matter

The recorded matter of the present disclosure includes a recording medium and an image formed on the recording medium with the ink of the present disclosure.

An inkjet recording device and an inkjet recording method are used to record the image on the recording medium to obtain the recorded matter.

Ink Container

The ink container of the present disclosure has an ink accommodating unit to accommodate the ink of the present disclosure and other optional suitably-selected members.

There is no specific limit to the container. Any form, any structure, any size, and any material can be suitably selected to suit to a particular application. For example, a container having at least an ink bag formed of aluminum laminate film, a resin film, etc. can be suitably used.

Inkjet Recording Device and Inkjet Recording Method

The inkjet recording method of the present disclosure includes discharging the ink of the present disclosure from nozzles of a recording head and applying the ink to a recording medium for recording.

The inkjet recording device of the present disclosure includes the ink container of the present disclosure, a recording head to discharge ink droplets, and other optional members.

The ink of the present disclosure can be suitably applied to various recording devices employing an inkjet recording method, such as printers, facsimile machines, photocopiers, multifunction peripherals (serving as a printer, a facsimile machine, and a photocopier), and 3D model manufacturing devices (3D printers, additive manufacturing device).

In the present disclosure, the recording device and the recording method represent a device capable of discharging ink, various processing fluids, etc. to a recording medium and a method of recording an image on the recording medium using the device, respectively. The recording medium means an article to which ink or various processing fluids can be attached at least temporarily.

The recording device may further optionally include a device relating to feeding, conveying, and ejecting the recording medium and other devices referred to as a pre-processing device, a post-processing device, etc. in addition to the head portion to discharge the ink.

The recording device and the recording method may further optionally include a heater for use in the heating process and a drier for use in the drying process. For example, the heating device and the drying device include devices including heating and drying the print surface of a recording medium and the opposite surface thereof. The heating device and the drying device are not particularly limited. For example, a fan heater and an infra-red heater can be used. Heating and drying can be conducted before, during, and after printing.

In addition, the recording device and the recording method are not limited to those producing meaningful visible images such as texts and figures with the ink. For example, the recording device and the recording method can produce patterns like geometric design and 3D images.

In addition, the recording device includes both a serial type device in which the liquid discharging head is caused to move and a line type device in which the liquid discharging head is not moved, unless otherwise specified.

Furthermore, in addition to the desktop type, this recording device includes a wide device capable of printing images on a large recording medium such as AO and a continuous printer capable of using continuous paper wound up in a roll form as recording media.

Figure 2:
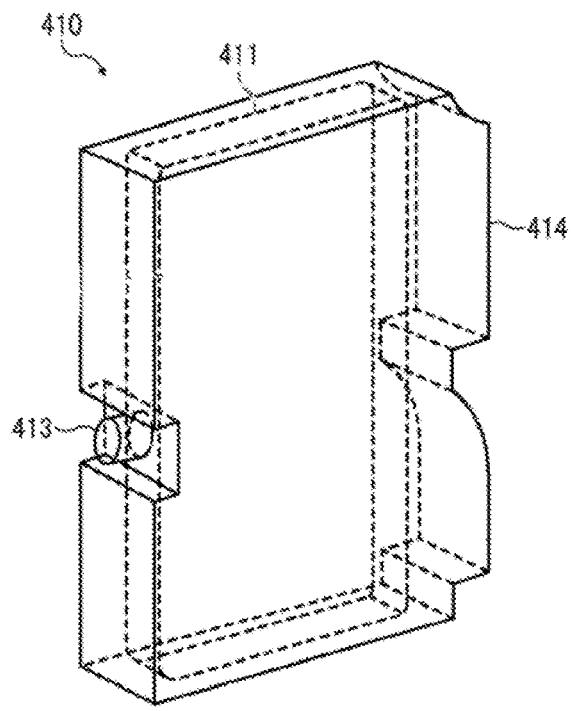
FIG. 2 is a perspective diagram illustrating an example of the main tank in the inkjet recording device.

The recording device of the present disclosure is described using an example with reference to FIG. 1 and FIG. 2. FIG. 1 is a perspective view of the recording device. FIG. 2 is a perspective view of the main tank. An image forming apparatus 400 as an example of the recording device is a serial type image forming apparatus. A mechanical unit 420 is disposed in an exterior 401 of the image forming apparatus 400. Each ink accommodating unit 411 of each main tank 410 (410k, 410c, 410m, and 410y) for each color of black (K), cyan (C), magenta (M), and yellow (Y) is made of a packing member such as aluminum laminate film. The ink accommodating unit 411 is accommodated in, for example, a plastic housing unit 414. As a result, the main tank 410 is used as an ink cartridge of each color.

A cartridge holder 404 is disposed on the rear side of the opening when a cover 401c is opened. The cartridge holder 404 is detachably attached to the main tank 410. As a result, each ink discharging outlet 413 of the main tank 410 communicates with a discharging head 434 for each color via a supplying tube 436 for each color so that the ink can be discharged from the discharging head 434 to a recording medium.

This recording device may include not only a portion discharging ink but also a device referred to as a pre-processing device, a post-processing device, etc.

As an example of the pre-processing device and the post-processing device, as in the case of the ink such as black (K), cyan (C), magenta (M), and yellow (Y), the pre-processing device and the post-processing device may further include a liquid accommodating unit including a pre-processing fluid and/or a post-processing fluid to discharge the pre-processing fluid and/or the post-processing fluid according to an inkjet printing method.

As another example of the pre-processing device and the post-processing device, it is suitable to dispose a pre-processing device and a post-processing device which does not employ the inkjet printing method but a blade coating method, a roll coating method, or a spray coating method.

How to use the ink is not limited to the inkjet printing method.

Specific examples of such methods other than the inkjet printing method include, but are not limited to, blade coating methods, gravure coating methods, bar coating methods, roll coating methods, dip coating methods, curtain coating methods, slide coating methods, die coating methods, and spray coating methods.

The applications of the ink of the present disclosure are not particularly limited and can be suitably selected to suit to a particular application. For example, the ink can be used for printed matter, a paint, a coating material, and foundation. Furthermore, the ink can be used to form two-dimensional texts and images and furthermore a three-dimensional solid object (3D modeling object) as a material for 3D modeling.

An apparatus for fabricating a three-dimensional object can be any known device with no particular limit. For example, the apparatus includes an ink container, a supplying device, and a discharging device, a drier, etc.

The three-dimensional solid object includes an object manufactured by repeating coating with ink. In addition, the three-dimensional solid object includes a molded processed product manufactured by processing a structure having a substrate such as a print medium printed with ink.

The molded processed product is fabricated from printed matter or a structure having a sheet-like form, film-like form, etc. by, for example, heating drawing or punching.

The molded processed product is suitably used for articles which are molded after surface-decorating. Examples thereof are gauges or operation panels of vehicles, office machines, electric and electronic devices, cameras, etc.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

Synthetic Example 1

Synthesis of Liquid Dispersion 1 of Resin Particle

A mixture of 44 parts of styrene, 53 parts of 2-ethylhexyl acrylate, 1.4 parts of AQUALON HS-10 (manufactured by DKS Co. Ltd.), and 50 parts of deionized water was emulsified by a HOMOMIXER to obtain a uniform milk white emulsified liquid.

87 parts of water having a pH of 3 preliminarily controlled by deionized water and sulfuric acid was charged in a 1 L flask equipped with a stirrer, a thermometer, a nitrogen introducing tube, and a reflux tube and heated to 70 degrees C. while introducing nitrogen.

Thereafter, 2.8 parts of aqueous solution of 10 percent by mass AQUALON HS-10 (manufactured by DKS Co. Ltd.) as a reactive emulsifier and 2.7 parts of aqueous solution of percent by mass ammonium persulfate were charged into the flask. Thereafter, the preliminarily prepared emulsified liquid was continuously dripped to the flask in 2.5 hours. In addition, 0.6 parts of an aqueous solution of 5 percent by mass ammonium persulfate was added every hour until three hours passed since the start of dripping. Subsequent to two-hour aging at 70 degrees C. after the dripping completed, the resultant was cooled down to adjust pH to 7-8 by an aqueous solution of sodium hydroxide to obtain a liquid dispersion 1 of resin particle.

Synthesis Example 2

Synthesis of Liquid Dispersion 2 of Resin Particle

A mixture of 41 parts of styrene, 51 parts of 2-ethylhexyl acrylate, 1.9 parts of vinyltriethoxy silane, 0.5 parts of 1,6-hexanediol dimethacrylate, 1.4 parts of AQUALON HS-10 (manufactured by DKS Co. Ltd.), and 50 parts of deionized water was emulsified by a HOMOMIXER to obtain a uniform milk white emulsified liquid.

87 parts of water having a pH of 3 preliminarily controlled by deionized water and sulfuric acid was charged in a 1 L flask equipped with a stirrer, a thermometer, a nitrogen introducing tube, and a reflux tube and heated to 70 degrees C. while introducing nitrogen.

Thereafter, 2.8 parts of aqueous solution of 10 percent by mass AQUALON HS-10 (manufactured by DKS Co. Ltd.) as a reactive emulsifier and 2.6 parts of aqueous solution of 5 percent by mass ammonium persulfate were charged into the flask. Thereafter, the preliminarily prepared emulsified liquid was continuously dripped to the flask in 2.5 hours. In addition, 0.6 parts of an aqueous solution of 5 percent by mass ammonium persulfate was added every hour until three hours passed since the start of dripping. Subsequent to two-hour aging at 70 degrees C. after the dripping completed, the resultant was cooled down to adjust pH to 7-8 by an aqueous solution of sodium hydroxide to obtain a liquid dispersion 2 of resin particle.

Synthesis Example 3

Synthesis of Liquid Dispersion 3 of Resin Particle

A liquid dispersion 3 of resin particle was obtained in the same manner as in Synthesis Example 2 except that the content of styrene was changed to 40 parts, the content of 2-ethylhexyl acrylate was changed to 50 parts, and the content of vinyltriethoxy silane was changed to 3.8 parts.

Synthesis Example 4

Synthesis of Liquid Dispersion 4 of Resin Particle

A liquid dispersion 4 of resin particle was obtained in the same manner as in Synthesis Example 2 except that the content of styrene was changed to 39 parts, the content of 2-ethylhexyl acrylate was changed to 49 parts, and the content of vinyltriethoxy silane was changed to 5.7 parts.

Synthesis Example 5

Synthesis of Liquid Dispersion 5 of Resin Particle

A liquid dispersion 5 of resin particle was obtained in the same manner as in Synthesis Example 2 except that the content of styrene was changed to 38 parts, the content of 2-ethylhexyl acrylate was changed to 48 parts, and the content of vinyltriethoxy silane was changed to 7.5 parts.

Synthesis Example 6

Synthesis of Liquid Dispersion 6 of Resin Particle

A liquid dispersion 6 of resin particle was obtained in the same manner as in Synthesis Example 3 except that the pH of 87 parts of water preliminarily controlled by deionized water and sulfuric acid was changed to 2.0.

Synthesis Example 7

Synthesis of Liquid Dispersion 7 of Resin Particle

A liquid dispersion 7 of resin particle was obtained in the same manner as in Synthesis Example 3 except that the pH of 87 parts of water preliminarily controlled by deionized water and sulfuric acid was changed to 2.5.

Synthesis Example 8

Synthesis of Liquid Dispersion 8 of Resin Particle

A liquid dispersion 8 of resin particle was obtained in the same manner as in Synthesis Example 3 except that the content of styrene was changed to 39 parts and the content of 1,6-hexanediol dimethacrylate was changed to 0.1 parts.

Synthesis Example 9

Synthesis of Liquid Dispersion 9 of Resin Particle

A liquid dispersion 9 of resin particle was obtained in the same manner as in Synthesis Example 3 except that the content of styrene was changed to 49 parts and the content of 2-ethylhexyl acrylate was changed to 41 parts.

Synthesis Example 10

Synthesis of Liquid Dispersion 10 of Resin Particle

A liquid dispersion 10 of resin particle was obtained in the same manner as in Synthesis Example 3 except that the content of styrene was changed to 58 parts and the content of 2-ethylhexyl acrylate was changed to 32 parts.

Synthesis Example 11

Synthesis of Liquid Dispersion 11 of Resin Particle

A liquid dispersion 11 of resin particle was obtained in the same manner as in Synthesis Example 3 except that the content of styrene was changed to 31 parts and the content of 2-ethylhexyl acrylate was changed to 59 parts.

Synthesis Example 12

Synthesis of Liquid Dispersion 12 of Resin Particle

A mixture of 41 parts of styrene, 53 parts of 2-ethylhexyl acrylate, 1.4 parts of AQUALON HS-10 (manufactured by DKS Co. Ltd.) as a reactive emulsifier, and 50 parts of deionized water was emulsified by a HOMOMIXER to obtain a uniform milk white emulsified liquid.

Thereafter, 80 parts of water having a pH of 3 preliminarily controlled by deionized water and sulfuric acid was charged in a 1 litter flask equipped with a stirrer, a thermometer, a nitrogen introducing tube, and a reflux tube and heated to 70 degrees C. while introducing nitrogen. Thereafter, 2.8 parts of aqueous solution of 10 percent by mass AQUALON HS-10 (manufactured by DKS Co. Ltd.) as a reactive emulsifier and 5.5 parts of aqueous solution of 5 percent by mass ammonium persulfate were charged into the flask. Thereafter, the preliminarily prepared emulsified liquid was continuously dripped to the flask in 5 hours.

In addition, 1.1 parts of an aqueous solution of 5 percent by mass ammonium persulfate was added every hour after the start of dripping.

Subsequent to two-hour aging at 70 degrees C. after the dripping completed, the resultant was cooled down to adjust pH to 7-8 by an aqueous solution of sodium hydroxide to obtain a liquid dispersion 12 of resin particle.

Synthesis Example 13

Synthesis of Liquid Dispersion 13 of Resin Particle

A mixture of 38 parts of styrene, 49 parts of 2-ethylhexyl acrylate, 7.5 parts of vinyltriethoxy silane, 1.4 parts of AQUALON HS-10 (manufactured by DKS Co. Ltd.) as a reactive emulsifier, and 50 parts of deionized water was emulsified by a HOMOMIXER to obtain a uniform milk white emulsified liquid.

Thereafter, 80 parts of water having a pH of 3 preliminarily controlled by deionized water and sulfuric acid was charged in a 1 litter flask equipped with a stirrer, a thermometer, a nitrogen introducing tube, and a reflux tube and heated to 70 degrees C. while introducing nitrogen. Thereafter, 2.8 parts of aqueous solution of 10 percent by mass AQUALON HS-10 (manufactured by DKS Co. Ltd.) as a reactive emulsifier and 5.5 parts of aqueous solution of 5 percent by mass ammonium persulfate were charged into the flask. Thereafter, the preliminarily prepared emulsified liquid was continuously dripped to the flask in 5 hours. In addition, 1.1 parts of an aqueous solution of 5 percent by mass ammonium persulfate was added every hour after the start of dripping. Subsequent to two-hour aging at 70 degrees C. after the dripping completed, the resultant was cooled down to adjust pH to 7-8 by an aqueous solution of sodium hydroxide to obtain a liquid dispersion 13 of resin particle.

Synthesis Example 14

Synthesis of Liquid Dispersion 14 of Resin Particle

A mixture of 31 parts of methylmethacrylate, 59 parts of 2-ethylhexyl acrylate, 3.8 parts of vinyltriethoxy silane, 0.5 parts of 1,6-hexane diol dimethacrylate, 1.4 parts of AQUALON HS-10 (manufactured by DKS Co. Ltd.), and 50 parts of deionized water was emulsified by a HOMOMIXER to obtain a uniform milk white emulsified liquid.

87 parts of water having a pH of 3 preliminarily controlled by deionized water and sulfuric acid was charged in a 1 litter flask equipped with a stirrer, a thermometer, a nitrogen introducing tube, and a reflux tube and heated to 70 degrees C. while introducing nitrogen.

Thereafter, 2.8 parts of aqueous solution of 10 percent by mass AQUALON HS-10 (manufactured by DKS Co. Ltd.) as a reactive emulsifier and 2.6 parts of aqueous solution of 5 percent by mass ammonium persulfate were charged into the flask. Thereafter, the preliminarily prepared emulsified liquid was continuously dripped to the flask in 2.5 hours. In addition, 0.6 parts of an aqueous solution of 5 percent by mass ammonium persulfate was added every hour until three hours passed since the start of dripping. Subsequent to two-hour aging at 70 degrees C. after the dripping completed, the resultant was cooled down to adjust pH to 7-8 by an aqueous solution of sodium hydroxide to obtain a liquid dispersion 14 of resin particle.

Synthesis Example 15

Synthesis of Liquid Dispersion 15 of Resin Particle

A mixture of 31 parts of methylmethacrylate, 61 parts of 2-ethylhexyl acrylate, 1.9 parts of vinyltriethoxy silane, 0.5 parts of 1,6-hexane diol dimethacrylate, 1.4 parts of AQUALON HS-10 (manufactured by DKS Co. Ltd.), and 50 parts of deionized water was emulsified by a HOMOMIXER to obtain a uniform milk white emulsified liquid.

87 parts of water having a pH of 3 preliminarily controlled by deionized water and sulfuric acid was charged in a 1 L flask equipped with a stirrer, a thermometer, a nitrogen introducing tube, and a reflux tube and heated to 70 degrees C. while introducing nitrogen.

Thereafter, 2.8 parts of aqueous solution of 10 percent by mass AQUALON HS-10 (manufactured by DKS Co. Ltd.) as a reactive emulsifier and 2.6 parts of aqueous solution of 5 percent by mass ammonium persulfate were charged into the flask. Thereafter, the preliminarily prepared emulsified liquid was continuously dripped to the flask in 2.5 hours. In addition, 0.6 parts of an aqueous solution of 5 percent by mass ammonium persulfate was added every hour until three hours passed since the start of dripping. Subsequent to two-hour aging at 70 degrees C. after the dripping completed, the resultant was cooled down to adjust pH to 7-8 by an aqueous solution of sodium hydroxide to obtain a liquid dispersion 15 of resin particle.

Synthesis Example 16

Synthesis of Liquid Dispersion 16 of Resin Particle

A mixture of 20 parts of methylmethacrylate, 72 parts of 2-ethylhexyl acrylate, 1.9 parts of vinyltriethoxy silane, 0.5 parts of 1,6-hexane diol dimethacrylate, 1.4 parts of AQUALON HS-10 (manufactured by DKS Co. Ltd.), and 50 parts of deionized water was emulsified by a HOMOMIXER to obtain a uniform milk white emulsified liquid.

87 parts of water having a pH of 3 preliminarily controlled by deionized water and sulfuric acid was charged in a 1 L flask equipped with a stirrer, a thermometer, a nitrogen introducing tube, and a reflux tube and heated to 70 degrees C. while introducing nitrogen. Thereafter, 2.8 parts of aqueous solution of 10 percent by mass AQUALON HS-10 (manufactured by DKS Co. Ltd.) as a reactive emulsifier and 2.6 parts of aqueous solution of 5 percent by mass ammonium persulfate were charged into the flask. Thereafter, the preliminarily prepared emulsified liquid was continuously dripped to the flask in 2.5 hours. In addition, 0.6 parts of an aqueous solution of 5 percent by mass ammonium persulfate was added every hour until three hours passed since the start of dripping. Subsequent to two-hour aging at 70 degrees C. after the dripping completed, the resultant was cooled down to adjust pH to 7-8 by an aqueous solution of sodium hydroxide to obtain a liquid dispersion 16 of resin particle.

Synthesis Example 17

Synthesis of Liquid Dispersion 17 of Resin Particle

A mixture of 10 parts of methylmethacrylate, 82 parts of 2-ethylhexyl acrylate, 1.9 parts of vinyltriethoxy silane, 0.5 parts of 1,6-hexane diol dimethacrylate, 1.4 parts of AQUALON HS-10 (manufactured by DKS Co. Ltd.), and 50 parts of deionized water was emulsified by a HOMOMIXER to obtain a uniform milk white emulsified liquid.

87 parts of water having a pH of 3 preliminarily controlled by deionized water and sulfuric acid was charged in a 1 L flask equipped with a stirrer, a thermometer, a nitrogen introducing tube, and a reflux tube and heated to 70 degrees C. while introducing nitrogen.

Thereafter, 2.8 parts of aqueous solution of 10 percent by mass AQUALON HS-10 (manufactured by DKS Co. Ltd.) as a reactive emulsifier and 2.6 parts of aqueous solution of 5 percent by mass ammonium persulfate were charged into the flask. Thereafter, the preliminarily prepared emulsified liquid was continuously dripped to the flask in 2.5 hours. In addition, 0.6 parts of an aqueous solution of 5 percent by mass ammonium persulfate was added every hour until three hours passed since the start of dripping. Subsequent to two-hour aging at 70 degrees C. after the dripping completed, the resultant was cooled down to adjust pH to 7-8 by an aqueous solution of sodium hydroxide to obtain a liquid dispersion 17 of resin particle.

Next, the solid portion concentration, the volume average particle diameter, and the glass transition temperature of each liquid dispersion of resin particle obtained are shown in Table 1.

The volume average particle diameter was measured by using, for example, a particle size analyzer (Nanotrac Wave-UT151, manufactured by MicrotracBEL Corp.).

The glass transition temperature was measured by DSC SYSTEM Q-2000 (manufactured by TA INSTRUMENTS. JAPAN). DSC curve at the second temperature rising was selected to obtain the glass transition temperature according to the midpoint method.

Measuring Conditions

Hold 5 minutes after cooled down to −70 degrees C.

Raise the temperature to 120 degrees C. at a temperature raising speed of 10 degrees C./min Hold 5 minutes after cooled down to −70 degrees C.

Raise the temperature to 120 degrees C. at a temperature raising speed of 10 degrees C./min.

TABLE 1

|  | Concentration of solid portion (percent by mass) | Volume average particle diameter (nm) | Glass transition temperature (degrees C.) |
|---|---|---|---|
| Liquid dispersion 1 of resin particle | 38.4 | 143 | −0.6 |
| Liquid dispersion 2 of resin particle | 38.7 | 145 | −5.4 |
| Liquid dispersion 3 of resin particle | 38.8 | 151 | −5.4 |
| Liquid dispersion 4 of resin particle | 38.5 | 142 | −0.5 |
| Liquid dispersion 5 of resin particle | 39.4 | 142 | −1.4 |
| Liquid dispersion 6 of resin particle | 39.3 | 146 | −4.3 |
| Liquid dispersion 7 of resin particle | 38.1 | 139 | −2.5 |
| Liquid dispersion 8 of resin particle | 38.8 | 127 | 0.2 |
| Liquid dispersion 9 of resin particle | 38.8 | 126 | −4.3 |
| Liquid dispersion 10 f resin particle | 39.1 | 135 | 12 |
| Liquid dispersion 11 f resin particle | 38.3 | 130 | 34 |
| Liquid dispersion 12 of resin particle | 39.7 | 133 | −0.4 |
| Liquid dispersion 13 of resin particle | 39.1 | 152 | −1.5 |
| Liquid dispersion 14 of resin particle | 38.7 | 153 | −22 |
| Liquid dispersion 15 of resin particle | 38.3 | 13 | −25 |

TABLE 1-continued

|  | Concentration of solid portion (percent by mass) | Volume average particle diameter (nm) | Glass transition temperature (degrees C.) |
|---|---|---|---|
| Liquid dispersion 16 of resin particle | 37.0 | 145 | −38 |
| Liquid dispersion 17 of resin particle | 38.4 | 138 | −58 |

Preparation Example 1

Preparation of Aqueous Dispersion 1 of Black Pigment-Containing Polymer

Preparation of Polymer Solution

After sufficient replacement with nitrogen gas in a flask equipped with a mechanical stirrer, a thermometer, a nitrogen gas introducing tube, a reflux tube, and a dripping funnel, 11.2 g of styrene, 2.8 g of acrylic acid, 12.0 g of lauryl methacrylate, 4.0 g of polyethylene glycol methacrylate, 0.4 g of mercapto ethanol, and 40 g of methylethyl ketone were mixed and heated to 65 degrees C.

Next, a liquid mixture of 100.8 g of styrene, 25.2 g of acrylic acid, 108.0 g of lauryl methacrylate, 36.0 g of polyethylene glycol methacrylate, 60.0 g of hydroxyethyl methacrylate, 3.6 g of mercapto ethanol, 2.4 g of azobisdimethyl valeronitrile, and 342 g of methylethyl ketone was dripped into the flask in two and a half hours. Subsequently, a liquid mixture of 0.8 g of azobismethyl valeronitrile and 18 g of methylethyl ketone was dripped into the flask in half an hour. After one-hour aging at 65 degrees C., 0.8 g of azobismethyl valeronitrile was added and aged for another hour. After the reaction, 800 g of [Polymer Solution] having a concentration of 50 percent by mass was obtained.

Preparation of Aqueous Dispersion 1 of Black Pigment-Containing Polymer 28 g of the [Polymer Solution], 32 g of black pigment (C.I. Pigment Black 7: Monarch 880, manufactured by Cabot Corporation), 13.6 g of 1 mol/L aqueous solution of potassium hydroxide, 20 g of methylethyl ketone, 13.6 g of deionized water were sufficiently stirred followed by mixing and kneading by a roll mill.

The thus-obtained paste was charged in 200 g of pure water. Subsequent to sufficient stirring, methylethyl ketone and water were distilled away by using an evaporator to obtain [Aqueous dispersion 1 of black pigment-containing polymer] having a pigment of 15 percent by mass and a solid portion of 20 percent by mass.

Example 1

Preparation of Ink 1

The liquid mixture having the following recipe was stirred for an hour and mixed uniformly. Thereafter, 33 percent by mass of the [Aqueous dispersion element 1 of polymer containing black pigment] was added and deionized water was added in such a manner that the total was 100 percent by mass followed by stirring for an hour.

Thereafter, the resultant was filtered by a cellulose acetate membrane filter having an average opening of 0.8 μm with an increased pressure to remove coarse particles to obtain Ink 1.

Liquid Mixture Recipe

| Liquid dispersion 2 of resin particle: | 15 parts |
|---|---|
| Propylene glycol: | 30 parts |
| 1,3-butane diol: | 5 parts |
| 2-ethyl-1,3-hexane diol: | 2 parts |
| 2,4,7,9-tetramethyl-4,7-decanediol: | 0.2 parts |
| Addition reaction product of perfluoroalkyl polyethylene oxide (DSN-403N, manufactured by DAIKIN INDUSTRIES, ltd.): | 0.2 parts |

Examples 2 to 10 and Comparative Examples 1 to 7

Preparation of Ink 2-17

Inks 2-17 were manufactured in the same manner as in Example 1 except that Liquid dispersion 2 of resin particle was changed to the liquid dispersions of resin particle shown in Table 2.

Next, an ink cartridge was filled with the thus-obtained inks 1-17 and images were formed using an inkjet printer (IPSiO GX e5500, manufactured by Ricoh Company Ltd.) including the ink cartridge.

The images formed as described above were evaluated according to the following criteria: The evaluation results and the measuring results of dynamic viscoelasticity of the ink film are shown in Tables 2 and 3.

Measuring of Dynamic Elasticity of Ink Film

First, each ink was dried for 48 hours at 100 degrees C. in a constant temperature tank employing heated wind circulation system to obtain an ink film having a thickness of about 0.3 mm, which was cut to a size of a length of about 30 mm and a width of about 10 mm. Thereafter, the ink film was measured by using ARES-G2 (manufactured by TA Instruments) with a freezer. After the sample of the ink film was set in a device at 20 degrees C. using a torsion solid clamp as a jig for fixing a sample, the sample was cooled down to −60 degrees C. under an auto tension of 2 g. 10 minutes after the temperature reached −60 degrees, the sample was measured under the following conditions. Based on the obtained measuring data, the storage elastic modulus at 20 degrees C. was defined as G1, the storage elastic modulus at 80 degrees C. was defined as G2, the storage elastic modulus at −20 degrees C. was defined as G3, and the storage elastic modulus at −40 degrees C. was defined as G4.

Measuring Conditions

Measuring mode: temperature sweep
Measuring range of temperature: −60-100 degrees C.
Temperature rising speed: 5 degrees C./min
Frequency: 1 Hz
Initial distortion: 0.1 percent
Auto tension: 2 g Image Density A solid square black image (100 percent duty) of 10 points with an ink attachment amount of 10,000 mg/m$^2$ was printed on gloss paper (LumiArtGross, weight 90 g/m$^2$, manufactured by Store Enso) for printing using the inkjet printer, Image density of the thus-obtained solid image was measured using a reflection type color spectrodensitometer (manufactured by X-RITE CORPORATION) and evaluated according to the following criteria:

Evaluation Criteria
E (Excellent): 1.5 or higher
G (Good): 1.2 to less than 1.5
M (Marginal): 0.9 to less than 1.2
P (Poor): Less than 0.9

Gloss Level of Image 60 degree gloss level (Image gloss level) of the black square solid image printed on the gloss paper (LumiArt- Gross, weight 90 g/m², manufactured by Store Enso) for printing by using the inkjet printer was measured by a gloss meter (4501-microgloss 60 degrees, manufactured by BYK Japan KK.) and compared with 60 degree gloss level (background gloss level) of the background of the gloss paper for printing. The comparison results were evaluated according to the following criteria:

60 degree gloss level of the background of the gloss paper for printing was 25.

Evaluation Criteria

G (Good): Gloss level of image equal to or greater than that of gloss level of background.

P (Poor): Gloss level of image less than that of gloss level of background.

Smearing Fixing Property

Three hours after a solid image was printed on gloss paper (LumiArtGross, weight 90 g/m², manufactured by Store Enso) by the inkjet printer with 100 duty per 6 cm×6 cm, and an ink attachment amount of 10,000 mg/m², white cotton cloth (manufactured by TOYO SEIKI Co., Ltd.) mounted onto a clock meter (manufactured by TOYO SEIKI Co., Ltd.) was moved back and forth on the printed solid image portion ten times. Thereafter, the ink contamination level of the white cotton was visually observed to make evaluation according to the following criteria:

Evaluation Criteria

E (Excellent): Free of contamination

G (Good): Contamination observed but causing no practical problem

M (Marginal): Slightly substantial contamination observed

P (Poor): Substantial contamination observed

Abrasion Resistance

A solid image was printed on gloss paper (LumiArtGross, weight 90 g/m², manufactured by Store Enso) for printing with an ink attachment amount of 10,000 mg/m²) using the inkjet printer and dried by a heated wind circulation drier for one minute at 100 degrees C. Next, polyurethane form tape (manufactured by 3M Company) having a thickness of 1.6 mm cut to a size of 1.1 cm square was attached to the friction block of a clock meter (manufactured by DAIEI KAGAKU SEIKI MFG. co., ltd.). Thereafter, gloss paper for printing cut to a size of 1.0 cm square was attached to the form tape. With the friction block down to bring the gloss paper for printing into contact with the solid image portion, the gloss paper was moved back and forth 10 times. After moving back and forth, the gloss paper for printing was peeled off together with the form tape. Image density of the image transferred to the gloss paper for printing was measured by using a reflection type color spectrodensitometer (manufactured by X-RITE CORPORATION) and evaluated according to the following criteria:

Evaluation Criteria

E (Excellent): Image density less than 0.1

G (Good): Image density of 0.1 to less than 0.2

M (Marginal): Image density of 0.2 to less than 0.3

P (Poor): Image density of 0.3 or greater

Blocking Resistance

Blocking resistance was evaluated according to TAPPI test T477, issued by Japan Technical Association of the Pulp and Paper Industry A solid image of 6 cm square was printed on gloss paper (LumiArtGross, weight 90 g/m², manufactured by Store Enso) for printing with an ink attachment amount of 10,000 mg/m²) using the inkjet printer. Thereafter, gloss paper for printing with no image on the print surface was attached to the solid image, which was sandwiched by two glass plates each having a size of 10 cm square. Under a load of 1 kg/m², this was left undone for 24 hours at 40 degrees C. and 90 percent RH. Thereafter, it was left undone for two more hours at room temperature (25 degrees C.). The adhesion degree of the two sheets of gloss sheets when they were peeled off was observed according to the following evaluation criteria.

Evaluation Criteria

E (Excellent): No blocking (surface of sample free of scratch or scar and no adhesion or sticking to the adjacent surface)

G (Good): Slight blocking occurred (Slight sticking. Slight scarring on the surface of sample).

M (Marginal): Significant blocking occurred (Sticking or adhesion to adjacent surface. Scarring observed on the surface of sample)

P (poor): Blocking occurred (Adhesion and fusion occurred with adjacent surface. Difficult to be stripped each other)

TABLE 2

| | Ink particle | Liquid dispersion of resin | G1 [$10^{-8}$ Pa] | G2/G1 | G3 [$10^{-8}$ Pa] | G4 [$10^{-8}$ Pa] |
|---|---|---|---|---|---|---|
| Example 1 | 1 | Liquid dispersion 2 of resin particle | 2.4 | 0.44 | 2.2 | 2.4 |
| Example 2 | 2 | Liquid dispersion 3 of resin particle | 3.5 | 0.65 | 3.6 | 4.8 |
| Example 3 | 3 | Liquid dispersion 4 of resin particle | 4.7 | 0.73 | 2.9 | 3.3 |
| Example 4 | 4 | Liquid dispersion 7 of resin particle | 3.8 | 0.66 | 3.1 | 3.8 |
| Example 5 | 5 | Liquid dispersion 8 of resin particle | 3.7 | 0.68 | 1.9 | 2.3 |
| Example 6 | 6 | Liquid dispersion 9 of resin particle | 4.5 | 0.42 | 3.3 | 3.7 |
| Example 7 | 7 | Liquid dispersion 11 of resin particle | 3.1 | 0.54 | 0.81 | 1.6 |
| Example 8 | 8 | Liquid dispersion 14 of resin particle | 2.9 | 0.75 | 0.77 | 1.4 |
| Example 9 | 9 | Liquid dispersion 15 of resin particle | 2.6 | 0.70 | 0.47 | 1.3 |
| Example 10 | 10 | Liquid dispersion 16 of resin particle | 2.2 | 0.69 | 0.32 | 1.2 |
| Comparative Example 1 | 11 | Liquid dispersion 1 of resin particle | 2.2 | 0.27 | 1.4 | 2.3 |
| Comparative Example 2 | 12 | Liquid dispersion 5 of resin particle | 5.5 | 0.80 | 3.5 | 4.5 |
| Comparative Example 3 | 13 | Liquid dispersion 6 of resin particle | 5.1 | 0.89 | 2.7 | 4.1 |

TABLE 2-continued

| Ink | Liquid dispersion of resin particle | G1 [$10^{-8}$ Pa] | G2/G1 | G3 [$10^{-8}$ Pa] | G4 [$10^{-8}$ Pa] |
|---|---|---|---|---|---|
| Comparative Example 4 | 14 Liquid dispersion 10 of resin particle | 10.7 | 0.35 | 3.2 | 4.6 |
| Comparative Example 5 | 15 Liquid dispersion 12 of resin particle | 1.6 | 0.35 | 2 | 3.8 |
| Comparative Example 6 | 16 Liquid dispersion 13 of resin particle | 6.2 | 0.81 | 2.2 | 2.8 |
| Comparative Example 7 | 17 Liquid dispersion 17 of resin particle | 1.8 | 0.69 | 0.27 | 0.9 |

TABLE 3

| | Ink | Image density | Gloss level | Smear fixability | Abrasion resistance | Blocking resistance |
|---|---|---|---|---|---|---|
| Example 1 | 1 | G | G | G | G | G |
| Example 2 | 2 | E | G | E | G | E |
| Example 3 | 3 | G | G | G | G | E |
| Example 4 | 4 | G | G | E | G | E |
| Example 5 | 5 | E | G | G | G | E |
| Example 6 | 6 | G | G | E | G | G |
| Example 7 | 7 | E | G | E | E | G |
| Example 8 | 8 | G | G | E | E | G |
| Example 9 | 9 | G | G | E | E | G |
| Example 10 | 10 | G | G | E | G | G |
| Comparative Example 1 | 11 | M | P | P | P | M |
| Comparative Example 2 | 12 | G | G | M | P | E |
| Comparative Example 3 | 13 | G | P | M | M | E |
| Comparative Example 4 | 14 | M | P | P | P | E |
| Comparative Example 5 | 15 | P | P | E | G | P |
| Comparative Example 6 | 16 | G | G | P | P | P |
| Comparative Example 7 | 17 | M | P | G | M | P |

Preparation Example I

Preparation of Pigment Dispersion I 2 mol/litter of sodium persulfate was added to and stirred with 100 g of carbon black (#44, nitrogen adsorption specific surface area: 110 m$^2$/g, DBP oil absorption amount: 78 cm$^3$/100 g, manufactured by Mitsubishi Chemical Corporation) at 75 degrees C. for 10 hours for acidic treatment.

Thereafter, the resultant was washed with pure water and dried and dispersed in water again. The dispersion was neutralized by sodium hydroxide followed by ultrafiltration membrane to separate the remaining salt.

Moisture was adjusted in such a manner that the pigment concentration was 20 percent by mass. The resultant was filtered with a membrane filter having an average opening diameter of 1.5 μm to remove coarse particles.

The electroconductivity, pH, and the acid value of the thus-obtained pigment dispersion was 1.35 mS/cm, 5.6, and 50 mgKOH/g, respectively. The amount of Na contained in 20 percent by mass liquid dispersion was 2,200 ppm.

In addition, when the decomposition product separated from the liquid dispersion was condensed and measured by Fourier Transform Infrared Spectroscopy (FT-IR), a peak derived from —COO— was observed around 1,590 cm-1 and 1,384 cm-1.

Synthetic Example I

Synthesis of Liquid Dispersion of Resin Particle I

A mixture of 133 parts of methylmethacrylate, 184 parts of 2-ethylhexyl acrylate, 2.2 parts of AQUALON HS-10 (manufactured by DKS Co. Ltd.) as a reactive emulsifier, and 166 parts of deionized water was emulsified by a HOMOMIXER to obtain a uniform milk white emulsified liquid.

Thereafter, 287 parts of water having a pH of 3 preliminarily controlled by deionized water and sulfuric acid was charged in a 1 litter flask equipped with a stirrer, a thermometer, a nitrogen introducing tube, and a reflux tube and heated to 70 degrees C. while introducing nitrogen.

Thereafter, 12.7 parts of aqueous solution of 10 percent by mass AQUALON HS-10 (manufactured by DKS Co. Ltd.) as a reactive emulsifier and 8.7 parts of aqueous solution of percent by mass ammonium persulfate were charged into the flask. Thereafter, the preliminarily prepared emulsion was continuously dripped to the flask in 2.5 hours.

In addition, 1.8 parts of an aqueous solution of 5 percent by mass ammonium persulfate was added every hour until three hours passed since the start of dripping.

Subsequent to two-hour aging at 70 degrees C. after the dripping completed, the resultant was cooled down to adjust pH to 7-8 by an aqueous solution of sodium hydroxide to obtain a liquid dispersion of resin particle I.

Synthesis Example II

Synthesis of Liquid Dispersion of Resin Particle II

A mixture of 120 parts of methylmethacrylate, 165 parts of 2-ethylhexyl acrylate, 32 parts of vinyltriethoxy silane, 2.2 parts of AQUALON HS-10 (manufactured by DKS Co. Ltd.) as a reactive emulsifier, and 166 parts of deionized water was emulsified by a HOMOMIXER to obtain a uniform milk white emulsified liquid.

Thereafter, 287 parts of water having a pH of 3 preliminarily controlled by deionized water and sulfuric acid was charged in a 1 litter flask equipped with a stirrer, a thermometer, a nitrogen introducing tube, and a reflux tube and heated to 70 degrees C. while introducing nitrogen.

Thereafter, 9.4 parts of aqueous solution of 10 percent by mass AQUALON HS-10 (manufactured by DKS Co., Ltd.) as a reactive emulsifier and 8.7 parts of aqueous solution of 5 percent by mass ammonium persulfate were charged into the flask. Thereafter, the preliminarily prepared emulsion was continuously dripped to the flask in 2.5 hours.

In addition, 1.8 parts of an aqueous solution of 5 percent by mass ammonium persulfate was added every hour until three hours passed since the start of dripping.

Subsequent to two-hour aging at 70 degrees C. after the dripping completed, the resultant was cooled down to adjust pH to 7-8 by an aqueous solution of sodium hydroxide to obtain a liquid dispersion of resin particle II.

Synthesis Example III

Synthesis of Liquid Dispersion of Resin Particle III

A liquid dispersion of resin particle III was obtained in the same manner as in Synthesis Example I except that the content of methylmethacrylate was changed to 79 parts and the content of 2-ethylhexyl acrylate was changed to 237 parts.

Synthetic Example IV

Synthesis of Liquid Dispersion of Resin Particle IV

A liquid dispersion of resin particle IV was obtained in the same manner as in Synthesis Example I except that the content of methylmethacrylate was changed to 95 parts and the content of 2-ethylhexyl acrylate was changed to 222 parts.

Synthetic Example V

Synthesis of Liquid Dispersion of Resin Particle V

A liquid dispersion of resin particle V was obtained in the same manner as in Synthesis Example I except that the content of methylmethacrylate was changed to 177 parts and the content of 2-ethylhexyl acrylate was changed to 139 parts.

Synthetic Example VI

Synthesis of Liquid Dispersion of Resin Particle VI

A liquid dispersion of resin particle VI was obtained in the same manner as in Synthesis Example I except that the content of methylmethacrylate was changed to 187 parts and the content of 2-ethylhexyl acrylate was changed to 130 parts.

Synthetic Example VII

Preparation Example of Liquid Dispersion of Resin Particle VII

A mixture of 133 parts of methylmethacrylate, 184 parts of 2-ethylhexyl acrylate, 2.2 parts of AQUALON HS-10 (manufactured by DKS Co., Ltd.) as a reactive emulsifier, and 166 parts of deionized water was emulsified by a HOMOMIXER to obtain a uniform milk white emulsified liquid.

Thereafter, 264 parts of water having a pH of 3 preliminarily controlled by deionized water and sulfuric acid was charged in a 1 litter flask equipped with a stirrer, a thermometer, a nitrogen introducing tube, and a reflux tube and heated to 70 degrees C. while introducing nitrogen.

Thereafter, 12.7 parts of aqueous solution of 10 percent by mass AQUALON HS-10 (manufactured by DKS Co., Ltd.) as a reactive emulsifier and 17.8 parts of aqueous solution of 5 percent by mass ammonium persulfate were charged into the flask. Thereafter, the preliminarily prepared emulsion was continuously dripped to the flask in 5 hours.

In addition, 3.8 parts of an aqueous solution of 5 percent by mass ammonium persulfate was added every hour until three hours passed since the start of dripping.

Subsequent to two-hour aging at 70 degrees C. after the dripping completed, the resultant was cooled down to adjust pH to 7-8 by an aqueous solution of sodium hydroxide to obtain a liquid dispersion of resin particle VII.

Synthetic Example VIII

Preparation of Liquid Dispersion of Resin Particle VIII

A mixture of 133 parts of methylmethacrylate, 183 parts of 2-ethylhexyl acrylate, 0.35 parts of n-octanethiol, 2.2 parts of AQUALON HS-10 (manufactured by DKS Co. Ltd.) as a reactive emulsifier, and 166 parts of deionized water was emulsified by a HOMOMIXER to obtain a uniform milk white emulsified liquid.

Thereafter, 264 parts of water having a pH of 3 preliminarily controlled by deionized water and sulfuric acid was charged in a 1 litter flask equipped with a stirrer, a thermometer, a nitrogen introducing tube, and a reflux tube and heated to 70 degrees C. while introducing nitrogen.

Thereafter, 12.7 parts of aqueous solution of 10 percent by mass AQUALON HS-10 (manufactured by DKS Co. Ltd.) as a reactive emulsifier and 17.8 parts of aqueous solution of 5 percent by mass ammonium persulfate were charged into the flask. Thereafter, the preliminarily prepared emulsion was continuously dripped to the flask in 5 hours.

In addition, 3.8 parts of an aqueous solution of 5 percent by mass ammonium persulfate was added every hour until three hours passed since the start of dripping.

Subsequent to two-hour aging at 70 degrees C. after the dripping completed, the resultant was cooled down to adjust pH to 7-8 by an aqueous solution of sodium hydroxide to obtain a liquid dispersion of resin particle VIII.

Synthetic Example IX

Preparation of Liquid Dispersion of Resin Particle IX

A mixture of 133 parts of methylmethacrylate, 184 parts of 2-ethylhexyl acrylate, 2.2 parts of AQUALON HS-10 (manufactured by DKS Co. Ltd.) as a reactive emulsifier, and 166 parts of deionized water was emulsified by a HOMOMIXER to obtain a uniform milk white emulsified liquid.

Thereafter, 288 parts of water having a pH of 3 preliminarily controlled by deionized water and sulfuric acid was charged in a 1 litter flask equipped with a stirrer, a thermometer, a nitrogen introducing tube, and a reflux tube and heated to 70 degrees C. while introducing nitrogen.

Thereafter, 12.7 parts of aqueous solution of 10 percent by mass AQUALON HS-10 (manufactured by DKS Co. Ltd.) as a reactive emulsifier and 9.6 parts of aqueous solution of 5 percent by mass ammonium persulfate were charged into the flask. Thereafter, the preliminarily prepared emulsion was continuously dripped to the flask in 2 hours.

In addition, 2.2 parts of an aqueous solution of 5 percent by mass ammonium persulfate was added every hour.

Subsequent to two-hour aging at 70 degrees C. after the dripping completed, the resultant was cooled down to adjust pH to 7-8 by an aqueous solution of sodium hydroxide to obtain a liquid dispersion of resin particle IX.

Next, the solid portion concentration and the volume average particle diameter of the liquid dispersion of each resin particle obtained are shown in Table 1.

The volume average particle diameter was measured by using, for example, a particle size analyzer (Nanotrac Wave-UT151, manufactured by MicrotracBEL Corp.).

TABLE I

| | Concentration of solid portion (percent by mass) | Volume average particle diameter (nm) |
|---|---|---|
| Liquid Dispersion of Resin Particle I | 38.8 | 149 |
| Liquid Dispersion of Resin Particle II | 37.2 | 146 |
| Liquid Dispersion of Resin Particle III | 39.4 | 145 |
| Liquid Dispersion of Resin Particle IV | 38.1 | 144 |

TABLE I-continued

| | Concentration of solid portion (percent by mass) | Volume average particle diameter (nm) |
|---|---|---|
| Liquid Dispersion of Resin Particle V | 38.8 | 150 |
| Liquid Dispersion of Resin Particle VI | 39.1 | 151 |
| Liquid Dispersion of Resin Particle VII | 39.4 | 146 |

Example I

Preparation of Ink

A liquid mixture of the following recipe was stirred for one hour for uniform mixing. Thereafter, the resultant was filtered by a cellulose acetate membrane filter having an average opening of 0.8 μm with an increased pressure to remove coarse particles to obtain Ink 2.

Ink Recipe

| | |
|---|---|
| Pigment dispersion I: | 5.0 percent by mass (solid portion) |
| Resin particle I: | 1.5 percent by mass (solid portion) |
| Resin particle II: | 4.5 percent by mass (solid portion) |
| Propylene glycol: | 30 percent by mass |
| 1,3-butane diol: | 5 percent by mass |
| 2-pyrolidone | 2.0 percent by mass |
| Surfactant (SOFTANOL EP7025, manufactured by Nippon Shokubai Co., Ltd.): | 1.0 percent by mass |
| 2,2,4-trimethyl-1,3-pentanediol: | 2.0 percent by mass |
| Deionized water | Rest to 100 percent by mass in total |

Examples II to VIII and Comparative Examples I to IX

Preparation of Ink

Inks I and III-XII were prepared in the same manner as in Example I except that the resin particles I and II were changed to the kind and the amount of the resin particle shown in Table II.

TABLE II

| | | Resin particle | | | |
|---|---|---|---|---|---|
| | Ink | Kind | Content (percent by mass of solid portion) | Kind | Content (percent by mass of solid portion) |
| Comparative Example 1 | 1 | Resin particle 1 | 1 | Resin particle 2 | 5 |
| Example 1 | 2 | Resin particle 1 | 1.5 | Resin particle 2 | 4.5 |
| Example 2 | 3 | Resin particle 1 | 2 | Resin particle 2 | 4 |
| Example 3 | 4 | Resin particle 1 | 3 | Resin particle 2 | 3 |
| Comparative Example 2 | 5 | Resin particle 1 | 3.5 | Resin particle 2 | 2.5 |
| Comparative Example 3 | 6 | Resin particle 3 | 2 | Resin particle 2 | 4 |
| Example 4 | 7 | Resin particle 4 | 2 | Resin particle 2 | 4 |
| Example 5 | 8 | Resin particle 5 | 2 | Resin particle 2 | 4 |
| Comparative Example 4 | 9 | Resin particle 6 | 2 | Resin particle 2 | 4 |
| Example 6 | 10 | Resin particle 7 | 2 | Resin particle 2 | 4 |
| Example 7 | 11 | Resin particle 8 | 2 | Resin particle 2 | 4 |
| Example 8 | 12 | Resin particle 9 | 2 | Resin particle 2 | 4 |

TABLE I-continued

| | Concentration of solid portion (percent by mass) | Volume average particle diameter (nm) |
|---|---|---|
| Liquid Dispersion of Resin Particle VIII | 39.5 | 141 |
| Liquid Dispersion of Resin Particle IX | 38.7 | 149 |

Next, an ink cartridge was filled with the thus-obtained Inks I-XII and images were formed using an inkjet printer (IPSiO GX e5500, manufactured by Ricoh Company Ltd.) to which the ink cartridge was mounted.

The images formed as described above were evaluated according to the following criteria:

The evaluation results and the measuring results of the content of THF soluble portion of the ink film, the mass average molecular mass, and the glass transition temperature were shown in Tables III and IV.

Content of THF Soluble Portion of Resin in Ink Film

First, ink was dried for 1 day at 100 degrees C. in a constant temperature tank employing heated wind circulation system to obtain an ink film having a thickness of about 0.3 mm, which was cut to a size of a length of about 50 mm and a width of about 10 mm.

The ink film cut to the size was dipped in 50 g of deionized water and maintained at 50 degrees C. for one day. Thereafter, the ink film was taken out from the deionized water and dried at 50 degrees C. for one day.

Next, about 30 mg of the ink film subjected to dipping treatment with deionized water was placed in an aluminum sample container, which was set in a thermogravimetric analyzer (SHIMADZU DTG-60, manufactured by Shimadzu Corporation), and measured in a nitrogen atmosphere in the following conditions.

Measuring Conditions

Temperature was raised from 40 to 100 degrees C. as a temperature rising speed of 10 degrees/minute.

Maintained at 100 degrees C. for 10 minutes

Temperature was raised from 100 to 500 degrees C. as a temperature rising speed of 10 degrees/minute.

Maintained at 500 degrees C. for 10 minutes

Thereafter, based on the obtained measuring results, the content R (percent by mass) of the resin in the ink film can be calculated from the mass M1 (mg) obtained after 10 minutes at 100 degrees C. and the mass M2 (mg) obtained after 10 minutes at 500 degrees C.

$$R=(M1-M2)/M1\times100$$

1 g of the dried film obtained after dipping treatment with deionized water was dipped in 10 g of THF and maintained at room temperature for one day.

The supernatant of the dip coated liquid was dried at 150 degrees C. for 3 hours in a drier and the THF soluble portion (percent) of the resin in the dried film was calculated assigning the masses before and after drying into the following relation.

In the following relation, M3 (g) was the mass of the dried film dipped in THS, M4 (g) is the mass of THF for use in dipping the dried film, M5 (g) is the mass of the supernatant of the dried dipping liquid, and M6 (g) was the mass after drying.

$$T=(M4\times M6)/(M3\times M5)\times 100$$

Based on the content R of the resin in the ink film and the THF soluble portion T (percent) of the resin in the dried film, the THF soluble portion of the resin contained in the dried film obtained by drying the ink of the present disclosure is calculated according to the following relation.

THF soluble portion of the resin contained in the dried film obtained by drying the ink of the present disclosure=$T/R\times 100$ Mass Average Molecular Mass of THF Soluble Portion The mass average molecular mass of the THF soluble portion was measured by using a gel permeation chromatography (GPC) measuring instrument (HLC-8220 GPC, manufactured by TOSOH CORPORATION).

The column used was TSKgel Super HZM-M 15 cm triplet (manufactured by TOSOH CORPORATION).

The resin to be measured was dissolved in THF to obtain a 0.15 percent by mass THF solution (including a stabilizer, manufactured by WAKO PURE CHEMICAL INDUSTRIES, LTD.) followed by filtration using a filter having an opening of 0.2 μm. The resultant filtrate was used as a sample.

100 μl of the THF sample solution was injected into the measuring instrument under the condition that the temperature was 40 degrees C. and the flow speed was 0.35 ml/min.

The mass average molecular mass of the THS soluble portion was calculated by using a standard curve created by a mono-dispersed polystyrene standard sample.

As the mono-dispersed polystyrene standard sample, Showdex STANDARD SERIES (manufactured by SHOWA DENKO K.K.) and toluene were used.

THF solutions of the following three kinds of mono-dispersed polystyrene standard samples were prepared and the measuring was conducted under the conditions specified above to create a standard curve by defining the maintaining time of the peak top as the light scattering molecular mass of the mono-dispersed polystyrene standard samples.

Solution A: S-7450 2.5 mg, S-678 2.5 mg, S-46.5 2.5 mg, S-2.90 2.5 mg, and THF 50 mL Solution B: S-3730 2.5 mg, S-257 2.5 mg, S-19.8 2.5 mg, S-0.580 2.5 mg, and THF 50 mL Solution C: S-1470 2.5 mg, S-112 2.5 mg, S-6.93 2.5 mg, S-2.90 2.5 mg, and THF 50 mL A refractive index (RI) detector is used as the detector.

Glass Transition Temperature of THF Soluble Portion

The glass transition temperature of the THF soluble portion was measured by DSC SYSTEM Q-2000 (manufactured by TA INSTRUMENTS, JAPAN).

Specifically, about 5.0 mg of the THF soluble portion of the resin placed in an aluminum sample container was set in an instrument to conduct measuring in nitrogen atmosphere under the following conditions.

A DSC curve at the second temperature rising was selected and the glass transition temperature was obtained by the midpoint method.

Hold 5 minutes after cooled down to −70 degrees C.

Raise the temperature to 120 degrees C. at a temperature raising speed of 10 degrees C./min.

Hold 5 minutes after cooled down to −70 degrees C.

Raise the temperature to 120 degrees C. at a temperature raising speed of 10 degrees C./min.

Image Density

A solid square black image (100 percent duty) of 10 points with an ink attachment amount of 10,000 mg/m$^2$ was printed on gloss paper (LumiArtGross, weight 90 g/m$^2$, manufactured by Store Enso) for printing using the inkjet printer. Image density of the thus-obtained solid image was measured using a reflection type color spectrodensitometer (manufactured by X-RITE CORPORATION) and evaluated according to the following criteria:

Evaluation Criteria

G (Good): 1.5 or higher

M (Marginal): 1.2 to less than 1.5

P (Poor): Less than 1.2

Gloss Level of Image 60 degree gloss level (Image gloss level) of the black square solid image printed on the gloss paper (LumiArtGross, weight 90 g/m$^2$, manufactured by Store Enso) for printing by using the inkjet printer was measured by a gloss meter (4501-microgloss 60 degrees, manufactured by BYK Japan KK.) and compared with 60 degree gloss level (background gloss level) of the background of the gloss paper for printing. The comparison results were evaluated according to the following criteria:

60 degree gloss level of the background of the gloss paper for printing was 25.

Evaluation Criteria

G (good): Background gloss level+2<Image gloss level

M (marginal): Background gloss level≤Image gloss level≤background gloss level+2

P (poor): Image gloss level<Background gloss

Smearing Fixing Property

Three hours after a solid image was printed on gloss paper (LumiArtGross, weight 90 g/m$^2$, manufactured by Store Enso) by the inkjet printer with 100 duty per 6 cm×6 cm, and an ink attachment amount of 10,000 mg/m$^2$, white cotton cloth (manufactured by TOYO SEIKI Co., Ltd.) mounted onto a clock meter (manufactured by TOYO SEIKI Co., Ltd.) was moved back and forth on the printed solid image portion ten times. Thereafter, the ink contamination level of the white cotton was visually observed to make evaluation according to the following criteria:

Evaluation Criteria

G (Good): Free of contamination

M (Marginal): Contamination observed but causing no practical problem

P (Poor): Substantial contamination observed

Blocking Resistance

Blocking resistance was evaluated according to TAPPI test T477, issued by Japan Technical Association of the Pulp and Paper Industry A solid image of 6 cm square was printed on gloss paper (LumiArtGross, weight 90 g/m², manufactured by Store Enso) for printing with an ink attachment amount of 10,000 mg/m²) using the inkjet printer. Thereafter, gloss paper for printing with no image on the print surface was attached to the solid image, which was sandwiched by two glass plates each having a size of 10 cm square. Under a load of 1 kg/m², this was left undone for 24 hours at 40 degrees C. and 90 percent RH.

Thereafter, it was left undone for two more hours at room temperature (25 degrees C.). The adhesion degree of the two sheets of gloss sheets when they were peeled off was observed according to the following evaluation criteria.

Evaluation Criteria
G (Good): No blocking (surface of sample free of scarring with no adhesion or sticking to the adjacent surface)
M (Marginal): Slight blocking occurred (Slight sticking. Slight scarring on the surface of sample).
P (Poor): Significant blocking occurred (Sticking or adhesion to adjacent surface. Scarring observed on the surface of sample)

TABLE III

| | Ink | Content (percent by mass) of THF soluble portion of resin in ink film | Glass transition temperature (degrees C.) of THF soluble portion | Mass average molecular mass of THF soluble portion |
|---|---|---|---|---|
| Example 1 | 2 | 22.6 | −1.6 | 520,000 |
| Example 2 | 3 | 32.1 | 0.6 | 610,000 |
| Example 3 | 4 | 46.8 | −1.1 | 590,000 |
| Example 4 | 7 | 33.4 | −17.9 | 480,000 |
| Example 5 | 8 | 30.7 | 17.2 | 630,000 |
| Example 6 | 10 | 35.2 | −3.1 | 300,000 |
| Example 7 | 11 | 44.1 | −3.5 | 140,000 |
| Example 8 | 12 | 26.6 | 1.2 | 910,000 |
| Comparative Example 1 | 1 | 18.2 | −3.7 | 510,000 |
| Comparative Example 2 | 5 | 56.5 | −0.7 | 560,000 |
| Comparative Example 3 | 6 | 31.5 | −23.1 | 440,000 |
| Comparative Example 4 | 9 | 28.7 | 22.5 | 570,000 |

TABLE IV

| | Ink | Image density | Gloss level | Smear fixability | Blocking resistance |
|---|---|---|---|---|---|
| Example 1 | 2 | G | G | G | G |
| Example 2 | 3 | G | G | G | G |
| Example 3 | 4 | M | M | G | M |
| Example 4 | 7 | G | G | G | M |
| Example 5 | 8 | G | G | M | G |
| Example 6 | 10 | G | M | G | G |
| Example 7 | 11 | M | M | G | M |
| Example 8 | 12 | G | G | M | G |
| Comparative Example 1 | 1 | G | G | P | G |
| Comparative Example 2 | 5 | P | P | G | G |
| Comparative Example 3 | 6 | G | G | G | P |
| Comparative Example 4 | 9 | G | G | P | G |

According to the present invention, an ink is provided with which images having good abrasion resistance, good blocking resistance, excellent gloss, and high image density are produced.

Having now fully described embodiments of the present invention, it will be apparent to one of ordinary skill in the art that many changes and modifications can be made thereto without departing from the spirit and scope of embodiments of the invention as set forth herein.

What is claimed is:

1. An ink comprising:
a solvent; and
a resin,
wherein a storage elastic modulus G1 of an ink film obtained by drying the ink is $2.0 \times 10^8$-$5.0 \times 10^8$ Pa at 20 degrees C. as measured by a dynamic viscoelasticity measuring method and a ratio (G2/G1) of the storage elastic modulus G1 to a storage elastic modulus G2 of the ink film measured at 80 degrees C. by the dynamic viscoelasticity measuring method is 0.30-0.85.

2. The ink according to claim 1, wherein a storage elastic modulus G3 of the ink film at −20 degrees C. as measured by the dynamic viscoelasticity measuring method is $1.0 \times 10^9$ Pa or greater.

3. The ink according to claim 1, wherein a storage elastic modulus G3 of the ink film at −20 degrees C. as measured by the dynamic viscoelasticity measuring method is $4.0 \times 10^8$ Pa to less than $1.0 \times 10^9$ Pa and a storage elastic modulus G4 of the ink film at −40 degrees C. as measured by the dynamic viscoelasticity measuring method is $1.0 \times 10^9$ Pa or greater.

4. The ink according to claim 1, wherein a ratio of a tetrahydrofuran soluble portion in the resin present in the ink film is 20 to 50 percent by mass to the resin present in the ink film at room temperature, and a glass transition temperature of the tetrahydrofuran soluble portion is −20 to 20 degrees C. as measured by differential scanning calorimetry.

5. The ink according to claim 1, wherein a mass average molecular mass of a tetrahydrofuran soluble portion of the resin present in the ink film is 200,000-900,000 as measured by gel permeation chromatography.

6. The ink according to claim 1, wherein a tetrahydrofuran insoluble portion of the resin present in the ink film is cross-linked.

7. The ink according to claim 1, wherein the resin includes a resin particle including an acrylic resin or a styrene resin.

8. The ink according to claim 1, wherein the resin includes a structure derived from a reactive emulsifier.

9. The ink according to claim 1, further comprising a pigment, wherein a particle diameter of the pigment is from 20 to 500 nm.

10. The ink according to claim 1, wherein a surface tension of the ink is 35 mN/s or less.

11. An ink container comprising:
the ink of claim 1; and
an ink accommodating unit to accommodate the ink of claim 1.

12. An inkjet recording device comprising:
the ink container of claim 11; and
a recording head configured to discharge ink droplets.

13. An inkjet recording method comprising:
discharging the ink of claim 1 from nozzles of a recording head; and
applying the ink to a recording medium for recording.

14. Recorded matter comprising:
a recording medium; and
an image formed on the recording medium with the ink of claim 1.

* * * * *